(12) United States Patent
Nakamura

(10) Patent No.: US 8,339,921 B2
(45) Date of Patent: Dec. 25, 2012

(54) OPTICAL INFORMATION RECORDING APPARATUS, OPTICAL INFORMATION RECORDING METHOD, OPTICAL INFORMATION RECORDING/REPRODUCING APPARATUS AND OPTICAL INFORMATION RECORDING/REPRODUCING METHOD

(75) Inventor: Yusuke Nakamura, Ebina (JP)

(73) Assignee: Hitachi, Ltd., Tokyo (JP)

( * ) Notice: Subject to any disclaimer, the term of this patent is extended or adjusted under 35 U.S.C. 154(b) by 182 days.

(21) Appl. No.: 12/453,538

(22) Filed: May 14, 2009

(65) Prior Publication Data
US 2009/0290472 A1 Nov. 26, 2009

(30) Foreign Application Priority Data
May 20, 2008 (JP) .................................. 2008-131454

(51) Int. Cl.
*G11B 7/00* (2006.01)

(52) U.S. Cl. ................ 369/103; 369/112.01; 369/112.1; 369/112.15

(58) Field of Classification Search .................. 369/103; 359/22
See application file for complete search history.

(56) References Cited

U.S. PATENT DOCUMENTS

| 7,120,105 B2 * | 10/2006 | Okamura et al. ........... 369/59.25 |
|---|---|---|
| 7,200,096 B2 * | 4/2007 | Phua et al. ..................... 369/103 |
| 7,218,262 B2 * | 5/2007 | Hayami ......................... 341/143 |
| 7,236,441 B2 * | 6/2007 | Tanaka et al. ................. 369/103 |
| 7,307,555 B2 * | 12/2007 | Nakamura ....................... 341/58 |
| 7,336,207 B2 * | 2/2008 | Nakagawa ....................... 341/59 |
| 7,466,246 B2 * | 12/2008 | Kahlman et al. ................ 341/59 |
| 7,688,699 B2 * | 3/2010 | Tachibana et al. ............ 369/103 |
| 7,755,820 B2 * | 7/2010 | Tateishi et al. .................. 359/21 |
| 8,018,356 B2 * | 9/2011 | Kim et al. ....................... 341/50 |
| 2009/0195421 A1 * | 8/2009 | Kim et al. ....................... 341/59 |

FOREIGN PATENT DOCUMENTS

JP 09-197947 1/1996

(Continued)

OTHER PUBLICATIONS

Schouhamer Immink K., "Codes for Mass Data Storage Systems, Chapter 9—Maxentropic Dc-free Sequences, Chapter 10—Dc-balanced Codes", Shannon Foundation Publishing, NL, Den Haag, XP002537930, 1991, pp. 185-190 and 201-232.

(Continued)

*Primary Examiner* — Muhammad N Edun
(74) *Attorney, Agent, or Firm* — Stites & Harbison, PLLC; Juan Carlos A. Marquez, Esq.

(57) ABSTRACT

An optical information recording/reproducing apparatus using holography comprises a signal generation unit that modulates input data, adds at least one control bit to each group of N bits, performs an NRZI-modulation on the modulated data, determines the at least one control bit such that a digital sum value of the NRZI-modulated data is 0, performs NRZI modulation on the data whose at least one control bit was determined, and rearranges the data to generate 2-dimensional data; a pickup that records the 2-dimensional data in a hologram disc and reproduces the 2-dimensional data from the hologram disc; and a signal processing unit that corrects the 2-dimensional data reproduced by the pickup, performs NRZI-modulation on the 2-dimensional data that has undergone a binarization operation, removes the at least one control bit added during the recording, and demodulates the data according to a modulation rule used during the recording.

18 Claims, 12 Drawing Sheets

FOREIGN PATENT DOCUMENTS

| | | |
|---|---|---|
| JP | 11346154 | 12/1999 |
| JP | 2005-190636 | 12/2003 |
| JP | 2004-272268 | 3/2004 |
| JP | 2005-524189 | 8/2005 |
| WO | WO 03/092004 | 11/2003 |
| WO | WO 2004/102542 A1 | 5/2004 |
| WO | WO 2005/098830 | 10/2005 |

OTHER PUBLICATIONS

The Extended European Search Report mailed Aug. 18, 2009.

J. Ashley et al., "Holographic Data Storage", IBM J. Res. Develop., vol. 44, No. 3, May 2000, pp. 341-369.

Chapter 9 "Maxentropic Dc-free Sequences", Chapte 10 "Dc-balanced Codes", pp. 185-232.

Immink, "EFMPlus: The Coding Format of the Multimedia Compact Disc", IEEE Transactions on Consumer Electronics, vol. 41, No. 3, Aug. 1995, pp. 491-497.

* cited by examiner

OPTICAL SYSTEM CONFIGURATION (GENERAL ANGLE-MULTIPLEXING METHOD)

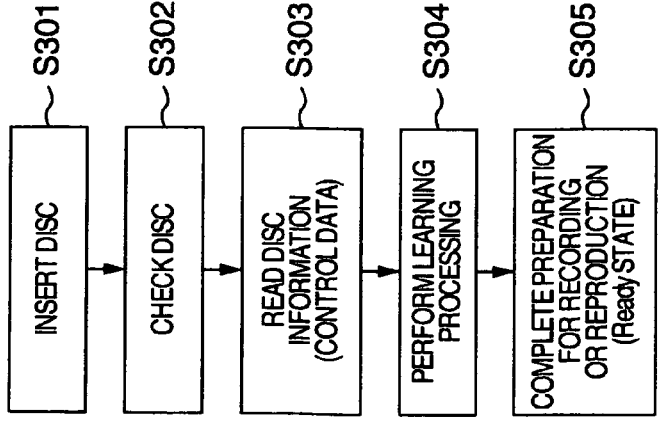
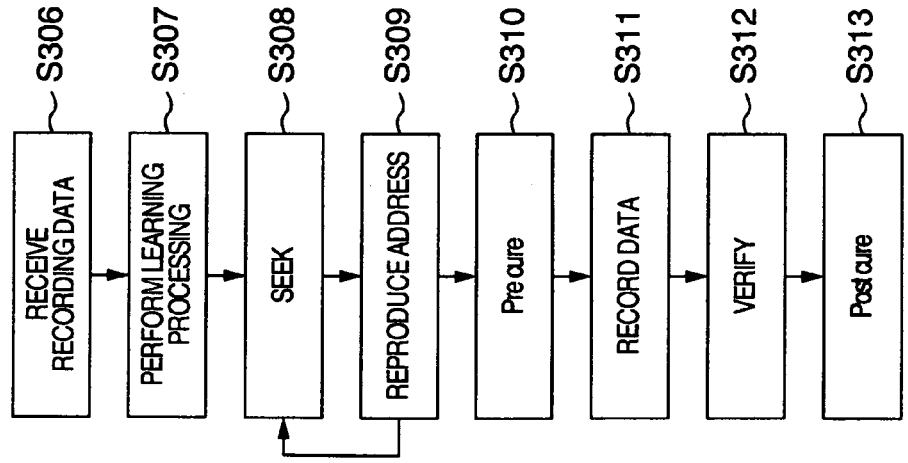
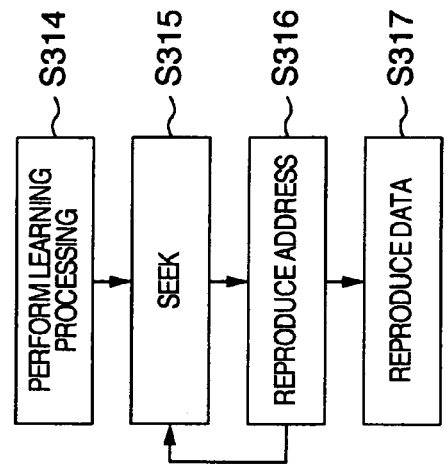

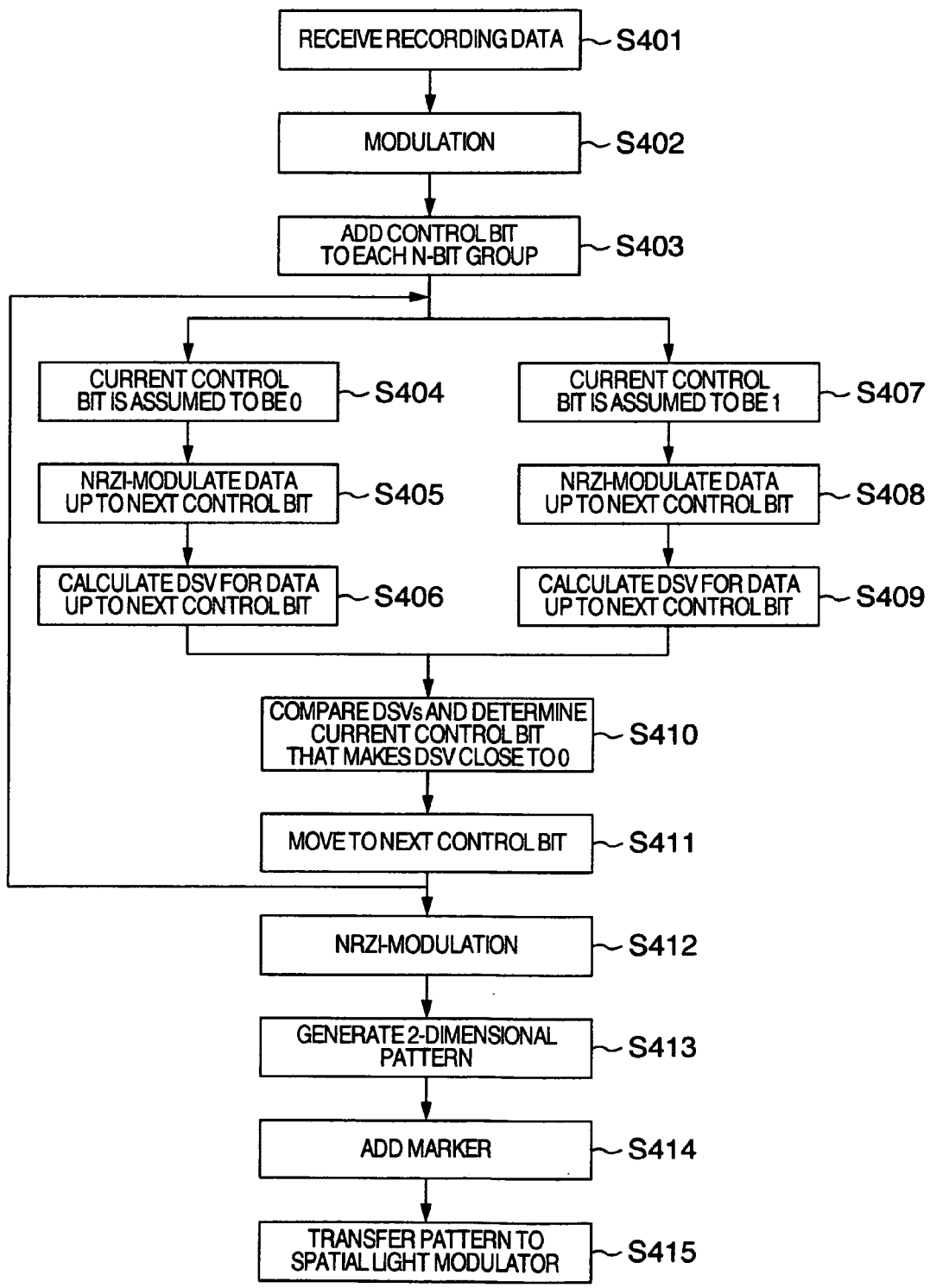

FLOW DURING REPRODUCTION (EMBODIMENT 1)

ENCODING METHOD (EMBODIMENT 1)

FIG.6A   1010100100101000100100010100100...

FIG.6B   #10101001,#00101000,#10010001,#01001000···
         # REPRESENTS CONTROL BIT

FLOW DURING RECORDING (EMBODIMENT 2)

FLOW DURING REPRODUCTION (EMBODIMENT 2)

ENCODING METHOD (EMBODIMENT 2)

FIG.9A  1010100100101000100100010100100...

FIG.9B  #10101001,#00101000,#10010001,#01001000...
                    # REPRESENTS CONTROL BIT

FIG.9C  010101001,000101000,101101110,110110111...

FLOW DURING RECORDING (EMBODIMENT 3)

MODULATION METHOD (EMBODIMENT 3)

FIG.11A

| DATA | MODULATED DATA |
|---|---|
| 00 | 000 |
| 01 | 110 |
| 10 | 101 |
| 11 | 011 |

FIG.11B

| DATA | MODULATED DATA |
|---|---|
| 00 | 000 |
| 01 | 001 |
| 10 | 010 |
| 11 | 100 |

ENCODING METHOD (CONVENTIONAL TECHNOLOGY)
FIG.12A
PRIOR ART
1010100100101000100100010100101001000···
FIG.12B
PRIOR ART
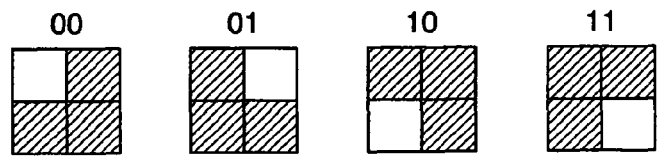
FIG.12C
PRIOR ART
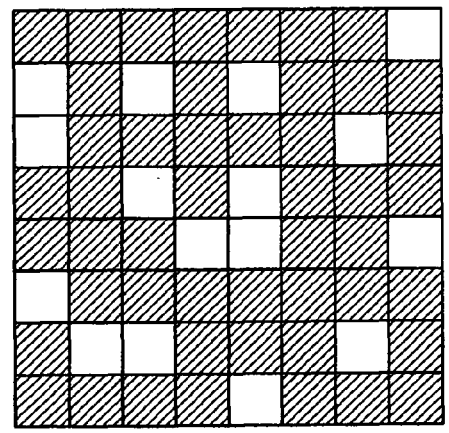

OPTICAL INFORMATION RECORDING APPARATUS, OPTICAL INFORMATION RECORDING METHOD, OPTICAL INFORMATION RECORDING/REPRODUCING APPARATUS AND OPTICAL INFORMATION RECORDING/REPRODUCING METHOD

INCORPORATION BY REFERENCE

The present application claims priority from Japanese application JP2008-131454 filed on May 20, 2008, the content of which is hereby incorporated by reference into this application.

BACKGROUND OF THE INVENTION

The present invention relates to an apparatus and a method for recording information on and/or reproducing information from optical information recording media by using holography.

Optical disc products with a recording density of about 50 GB are being commercialized that are based on Blu-ray Disc (BD) standard and High Definition Digital Versatile Disc (HD DVD) standard using a blue semiconductor laser.

Optical discs are expected to have an increased capacity of as large as 100 GB to 1 TB, comparable to that of HDD (Hard Disc Drive), in the future.

However, to realize such an ultrahigh density with the current optical discs, a novel storage technology is required, different from the conventional trend of high density technologies that attempts to increase the storage capacity by shortening a wavelength and increasing NA of an object lens.

With a wide-ranging studies on next generation storage technologies under way, a hologram recording technology is available that records digital information using holography.

Among the hologram recording technologies is one disclosed in JP-A-2004-272268. This patent document describes a so-called angle-multiplexing recording method which focuses a signal beam flux on an optical information recording medium through a lens and at the same time throws a reference beam of collimated rays to the medium to cause interferences to record a hologram and displays different pages of data on a spatial light modulator by changing an incidence angle of the reference beam to the optical recording medium to realize multiplex recording. The patent document also discloses a technology that puts an aperture (spatial filter) at a beam waist of a lens-focused signal beam to shorten the intervals of adjoining holograms, thereby increasing the recording density and capacity, compared with those of the conventional angle-multiplexing recording method.

Another hologram recording technology is disclosed in, for example, WO2004-102542. This document describes an example of shift multiplexing hologram recording method which, in one spatial light modulator, focuses a light from inner pixels as a signal beam and a light from outer ring-like pixels as a reference beam onto an optical recording medium through one and the same lens to cause interferences between the signal beam and the reference beam at near the focus plane of the lens to record a hologram.

There is an encoding method used for the above hologram recording, such as one disclosed in JP-A-9-197947. This patent document describes a 2-dimensional encoding method for hologram recording which throws at least one light wave through a 2-dimensional spatial light modulator to determine information to be recorded, characterized in that four adjoining pixels or 4-multiples of pixels in the 2-dimensional spatial light modulator are taken as one set and that one fourth of the number of pixels making up each set is made to pass the light and the remaining three fourths are made to interrupt it.

Another example of the conventional technology is JP-A-2005-190636, which provides "a holographic recording method, a holographic memory reproducing method, a holographic recording apparatus and a holographic memory reproducing apparatus, designed to improve an encoding rate by preventing variations in reproduced imaged intensity even if pixel blocks of different numbers of ON pixels are mixedly used."

SUMMARY OF THE INVENTION

In the method described in JP-A-2004272268 which applies the encoding technique of JP-A-9-197947 or in the method described in WO-2004-102542 which applies the encoding technique of JP-A-9-197947, 2-dimensional data of FIG. 12C is obtained by performing the encoding of FIG. 12B on data strings of FIG. 12A. These methods however, have a drawback of consuming a four-bit area to produce 2 bits of information and therefore being unable to improve the recording density. The method that simply transmits light with "1" and blocks light with "0" results in light transmissivity varying from one page to another. This difference in transmissivity causes different pages, when reproduced, to have different levels of reproduced image brightness, giving rise to a possibility that an erroneous decision may be made when the reference values for binarization decision are equal. There is another problem that consumption of dynamic range in a hologram recording medium is not constant.

Further, JP-A-2005-190636 does not take into account a possibility of the light transmissivity varying among different pages when pixel blocks with different ON-pixel numbers are mixedly used.

An object of this invention is to provide an encoding method capable of improving the recording density while keeping the transmissivity constant among different pages.

The object of this invention can be realized by, for example, controlling a 2-dimensional data arrangement.

In the recording of digital information using holography, this invention allows for improvement of the digital density while keeping the transmissivity constant among different pages.

Other objects, features and advantages of the invention will become apparent from the following description of the embodiments of the invention taken in conjunction with the accompanying drawings.

BRIEF DESCRIPTION OF THE DRAWINGS

FIGS. 3A-3C are flow charts showing an example of operation flow performed by the optical information recording/reproducing apparatus.

FIG. 4 is a flow chart showing an example of operation performed by the optical information recording/reproducing apparatus during data recording.

FIGS. 6A-6G show examples of encoding method performed by the optical information recording/reproducing apparatus.

FIGS. 9A-9F show examples of encoding methods performed by the optical information recording/reproducing apparatus.

FIGS. 11A and 11B show examples of modulation performed by the optical information recording/reproducing apparatus.

FIGS. 12A-12C show examples of conventional encoding methods performed by the optical information recording/reproducing apparatus.

DETAILED DESCRIPTION OF THE EMBODIMENTS

Now, embodiments of this invention will be described below.

Embodiment 1

Figure 1:
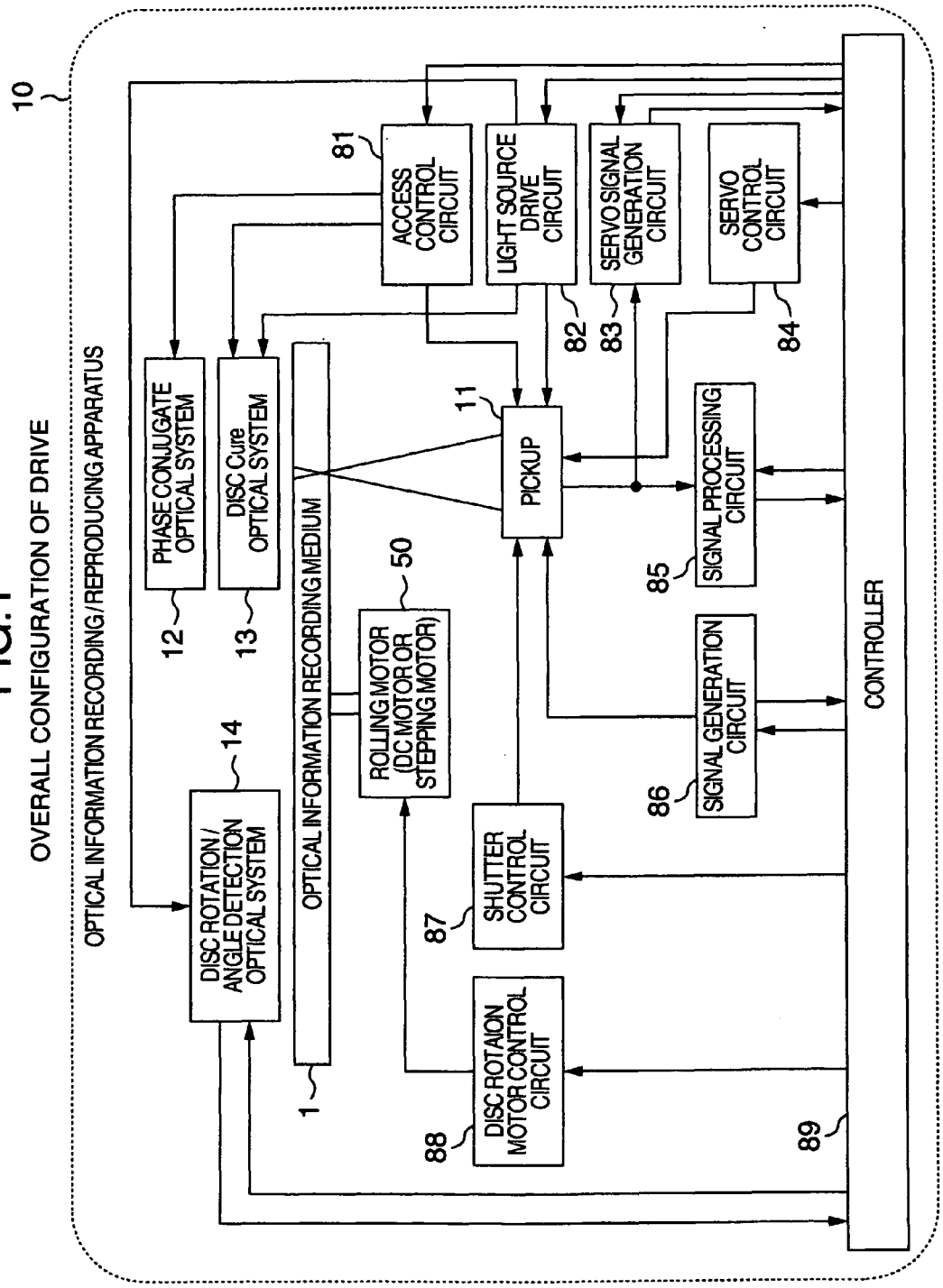
FIG. 1 is an overall configuration of an optical information recording/reproducing apparatus according to an embodiment.

FIG. 1 shows an overall configuration of the optical information recording/reproducing apparatus to record and/or reproduce digital information by using holography.

The optical information recording/reproducing apparatus 10 has a pickup 11, a phase conjugate optical system 12, a disc-cure optical system 13, a disc rotation angle detecting optical system 14 and a rotating motor 50. The optical information recording medium 1 can be turned by the rotating motor 50.

The pickup 11 emits a reference beam and a signal beam to the optical information recording medium 1 to record digital information by using holography.

At this time, the information signal to be recorded is sent by a controller 89 through a signal generation circuit 86 to a spatial light modulator described later in the pickup 11 where the signal beam is modulated by the spatial light modulator.

When the recorded information in the optical information recording medium 1 is reproduced, a phase conjugate beam of the reference beam emitted from the pickup 11 is generated by the phase conjugate optical system 12. The phase conjugate beam is a light wave that propagates in a direction opposite the incident light while keeping the same wave plane. A light reproduced by the phase conjugate beam is detected by an optical detector described later in the pickup 11 and is processed by a signal processing circuit 85 to reproduce the signal.

The time during which the reference beam and the signal beam are irradiated to the optical information recording medium 1 can be adjusted by controlling a shutter open-close time described later by the controller 89 through a shutter control circuit 87.

The disc-cure optical system 13 has a function of generating an optical beam used for pre-curing and post-curing the optical information recording medium 1. The pre-cure means a step of preliminarily applying a predetermined optical beam before irradiating the reference beam and the signal beam to a desired position when recording information at the position of interest in the optical information recording medium 1. The post-cure means is a step of applying a predetermined optical beam after having recorded information at a desired position in the optical information recording medium 1 in order to make the desired position unrecordable.

The disc rotation angle detecting optical system 14 is used to detect a rotation angle of the optical information recording medium 1. Adjusting the optical information recording medium 1 to a predetermined rotation angle can be done by detecting a signal corresponding to the rotation angle by the disc rotation angle detecting optical system 14 and controlling the rotation angle of the optical information recording medium 1 by the controller 89 using the detected signal through a disc rotating motor control circuit 88.

A light source drive circuit 82 supplies a predetermined amount of light source drive current to light sources inside the pickup 11, the disc-cure optical system 13 and the disc rotation angle detecting optical system 14, so that these light sources can emit light beams of a predetermined light quantity.

The pickup 11, the phase conjugate optical system 12 and the disc-cure optical system 13 are each provided with a mechanism that allows them to slide in a radial direction of the optical information recording medium 1. So their positions are controlled by these mechanisms through an access control circuit 81.

The recording technology using holography can record information of ultrahigh density and therefore tends to have very small allowable errors with respect to variations in inclination and position of the optical information recording medium 1. So a servo mechanism may be provided in the optical information recording/reproducing apparatus 10 to correct variations of, for example, inclination and position of the optical information recording medium 1, for which allowable errors are very small, through a servo control circuit 84 by installing a device in the pickup 11 to detect these variations and by generating a servo control signal in a servo signal generation circuit 83.

The pickup 11, the phase conjugate optical system 12, the disc-cure optical system 13 and the disc rotation angle detecting optical system 14 may be arranged commonly for some optical systems or all of the optical systems for simplification.

Figure 2:
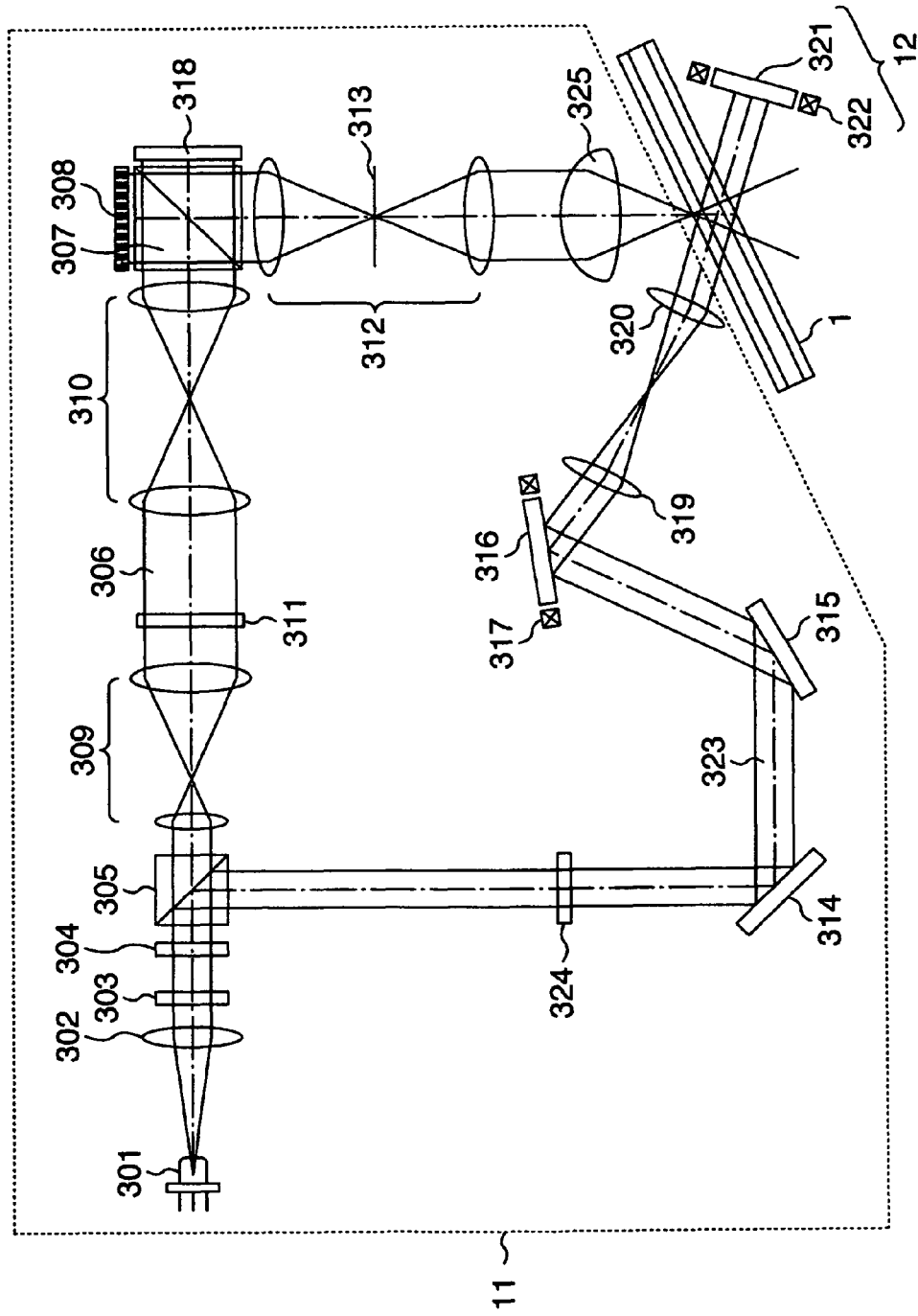
FIG. 2 is a schematic view showing an example of a pickup in the optical information recording/reproducing apparatus.

FIG. 2 shows an example configuration of the optical system for the pickup 11 in the optical information recording/reproducing apparatus 10.

A light beam emitted from the light source 301 passes through a collimate lens 302 and enters into a shutter 303. When the shutter 303 is open, the light beam passes through it and is controlled in its polarization direction by an optical element 304 constructed of ½ waveplate so that a ratio between P-polarization and S-polarization is a desired one. Then the beam enters a PBS (Polarization Beam Splitter) prism 305.

The light beam that has passed through the PBS prism 305 is expanded in its diameter by a beam expander 309, before passing through a phase mask 311, a relay lens 310 and a PBS prism 307 and entering into a spatial light modulator 308.

The signal beam that was given information by the spatial light modulator 308 passes through the PBS prism 307 and then travels through a relay lens 312 and a spatial filter 313. Then, the signal beam is focused by an object lens 325 onto the optical information recording medium 1.

A light beam reflected by the PBS prism 305 works as a reference beam. After being set in a predetermined polarization direction by a polarization direction conversion element 324 depending on whether the operation is being performed for recording or for reproduction, the beam passes through a mirror 314 and a mirror 315 and enters into a galvanometer mirror 316. The galvanometer mirror 316, since it adjusts its angle by an actuator 317, can set to a desired angle the incident angle of the reference beam entering into the optical information recording medium 1 after passing through a lens 319 and a 320.

By having the signal beam and the reference beam overlap each other in the optical information recording medium 1 as described above, interference patterns are formed in the recording medium and then written into the recording medium to record the information. Further, since the incidence angle of the reference beam entering the optical information recording medium 1 can be changed by the galvanometer mirror 316, the angle multiplexing-based recording can be performed.

In reproducing the recorded information, the reference beam is applied to the optical information recording medium 1. The light beam that has passed through the optical information recording medium 1 is reflected by a galvanometer mirror 321 to generate a phase conjugate beam.

The reproduced light beam generated by this phase conjugate beam propagates through the object lens 325, the relay lens 312 and the spatial filter 313. Then, the reproduced light beam is reflected by the PBS prism 307 and enters into an optical detector 318 to reproduce the recorded signal.

The optical system configuration of the pickup 11 is not limited to FIG. 2.

FIGS. 3A-3C show the operation flow for the recording and reproduction in the optical information recording/reproducing apparatus 10. Here, a recording and reproduction flow using holography will be explained.

FIG. 3A shows an operation flow from the optical information recording medium 1 being inserted into the optical information recording/reproducing apparatus 10 until the recording or reproduction is ready. FIG. 3B shows an operation flow from the standby state until the information is recorded in the optical information recording medium 1. FIG. 3C shows an operation flow from the standby state until the information recorded in the optical information recording medium 1 is reproduced.

When a medium is inserted (S301) as shown in FIG. 3A, the optical information recording/reproducing apparatus 10 makes a disc check to see if the inserted medium is intended for recording or reproducing digital information using holography (S302).

If the disc check result finds that the disc is intended to record or reproduce digital information using holography, the optical information recording/reproducing apparatus 10 reads control data for the optical information recording medium and retrieves, for example, information about the optical information recording medium and information about various setting conditions for recording or reproduction (S303).

After the control data has been read out, the optical information recording/reproducing apparatus 10 makes various adjustments according to the control data and executes learning processing concerning the pickup 11 (S304). Now the optical information recording/reproducing apparatus 10 is ready for recording or reproduction (S305).

The operation flow from the standby state to the recording of information, as shown in FIG. 3B, involves receiving data to be recorded and sending information corresponding to the data to the spatial light modulator in the pickup 11 (S306).

Then, to record high quality information in the optical information recording medium, various learning processing is executed in advance as required (S307) and, at the same time, seek operation (S308) and address regeneration (S309) are repeated to put the pickup 11 and the disc-cure optical system 13 at a predetermined position on the optical information recording medium.

Then, a light beam emitted from the disc-cure optical system 13 is applied to the medium to pre-cure a predetermined area (S310). The reference beam and the signal beam emitted from the pickup 11 are used to record data (S311).

After the data is recorded, the data is verified as necessary (S312) and the light beam emitted from the disc-cure optical system 13 is used for post-curing (S313).

In the operation flow from the standby state to the reproduction of the recorded information, as shown in FIG. 3C, various learning processing is executed as necessary in advance (S314). Then, the seek operation (S315) and the address regeneration (S316) are repeated to put the pickup 11 and the phase conjugate optical system 12 at a predetermined position on the optical information recording medium.

After this, the reference beam is emitted from the pickup 11 to read information recorded in the optical information recording medium (S317).

The encoding method in this example will be described in detail by referring to FIG. 4, FIG. 5 and FIGS. 6A-6G.

Figure 5:
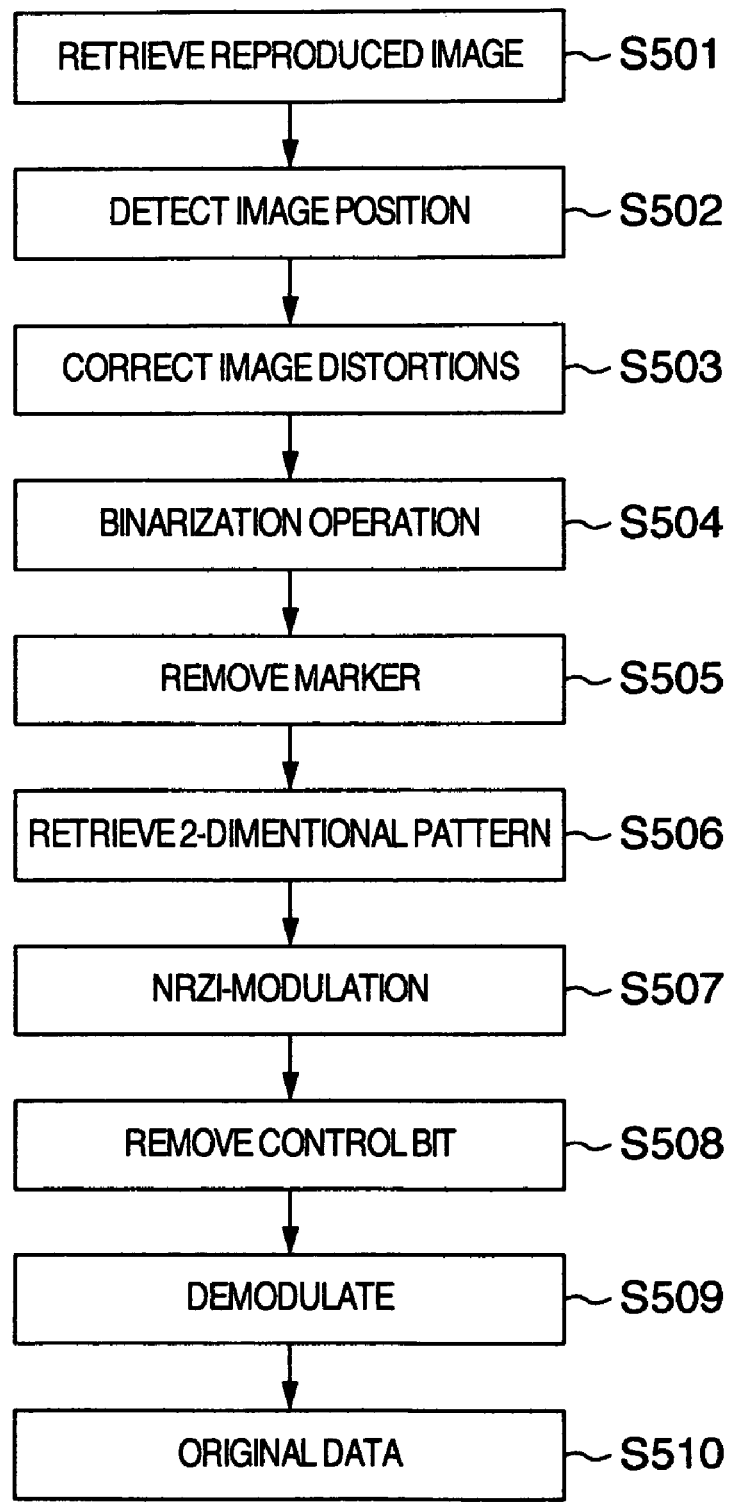
FIG. 5 is a flow chart showing an example of detailed operation flow performed by the optical information recording/reproducing apparatus during data reproduction.

FIG. 4 shows a detailed operation flow of S306 in FIG. 3B. FIG. 5 shows a detailed operation flow of S317 in FIG. 3C. FIGS. 6A-6G show examples of processing.

First, detailed operations during recording will be explained. When the signal generation circuit 86 receives one page of recording data (S401) (FIG. 6A), it modulates data strings by using a modulation table (S402). This modulation is done to facilitate detection of data during reproduction by preventing the same data "0" or "1" from repeating continuously and also to control spatial frequency characteristics of patterns to be finally recorded. This modulation, however, may not be performed. Next, the modulated data is divided into units of N bits, to each of which one control bit is added (S403) (FIG. 6B). The control bit is determined to be "0" or "1" according to a method described below. First, let us assume that a control bit at a certain position is "0" (S404). An NRZI (None Return to Zero Inverted) modulation is performed on a data string up to the next control bit. This modulation leaves the value unchanged if the bit is "0" and inverts the value if it is "1" (S405). Unlike the NRZI modulated data, a DSV (Digital Sum Value), which is an accumulated value of 1 in the data string taken as +1 and 0 as −1, is calculated up to the next control bit (S406). To make the value of page data constant among different pages, it is desired that the DSV be a sum value not only for the data string between the control bits but also for the data following the entire NRZI modulation up to the control bit. Next, when the control bit is assumed to be "1", operations similar to S404, S405 and S406 are also executed. Here, the DSVs calculated in S406 to S409 are compared to determine the control bit added in S403 to make DSV close to 0 (S410) (FIG. 6C). These operations from S404 to S410 are repeated (S411) to determine all the added control bits. On the data strings for which control bits were determined, the NRZI modulation is performed to generate data strings to be recorded (S412) (FIG. 6D).

Figure 6E:
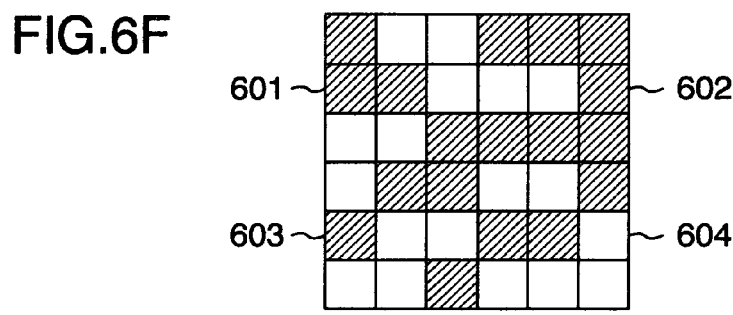
Figure 6F:
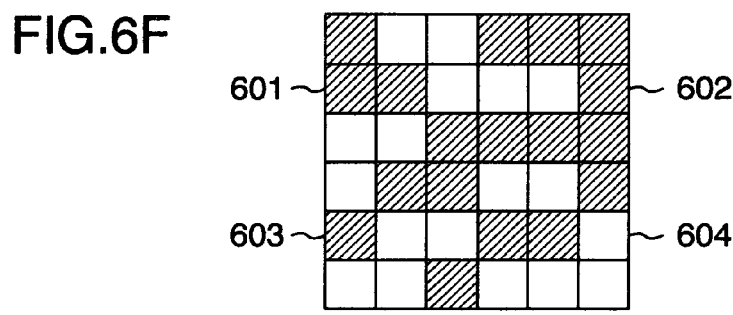
Figure 6G:
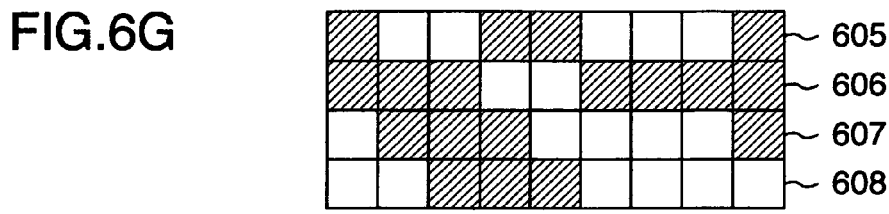

Then, two-dimensional data is constructed as shown in FIG. 6E, with "0" taken as "non-transmissive" and "1" as "transmissive" (they may be reverse). For each unit to which a control bit is inserted, an area of n (vertical)×m (horizontal) pixels is set (601, 602, 603, 604) and bits are arranged there. This bit arrangement for each unit is repeated the same number of times as a page of data to create one page of 2-dimensional data (S413). In the example of FIG. 6F, the bit arrangement in the unit and the unit arrangement in the page are done by placing data beginning with the upper left and moving toward right and, when the right end is reached, moving one line down and then toward right. The data arrangement is not limited to this method. FIG. 6G shows an example configuration where n=1.

A marker that works as a reference during reproduction is added to the 2-dimensional data constructed as described above (S414). The data marked in this way is transferred to the spatial light modulator 308 (S415).

Next, a detailed operation during reproduction will be explained. First, image data retrieved from the optical detector 318 is transferred to the signal processing circuit 85 (S501). The image position is detected with an image marker taken as a reference (S502). The image data undergoes a distortion correction, including image inclination, magnification and distortion (S503). The corrected image is then subjected to a binarization operation (S504) and removed of markers (S505) to obtain 2-dimensional data (S506). Although the binarization generally employs a method of comparing adjoining bits, other methods may be employed. By reversing the recording procedure, the 2-dimensional data is rearranged into 1-dimensional data, which then undergoes the NRZI modulation (S507). The data is removed of the added control bits (S508) and demodulated into the original data strings by using the modulation table used for recording, thus reproducing the original data (S509) (S510).

The explained drive construction and operation are just one example and this invention can employ other constructions and can be applied not only to the angle-multiplexing method but also to the shift multiplexing method. The same is true of the following embodiments.

With the above operation, 2-dimensional data can be created whose ratios of transmissive and non-transmissive bits are always even in the entire page data although they may differ among different units. This in turn allows the data to be recorded with the transmissivity kept constant among pages. During recording, a signal beam modulated by the spatial light modulator 308 is focused by the object lens 325 onto the recording medium, so a Fourier-transformed image is recorded. This means that if the transmissivity of created 2-dimensional data differs among different units, the recording medium is not affected.

Embodiment 2

Figure 7:
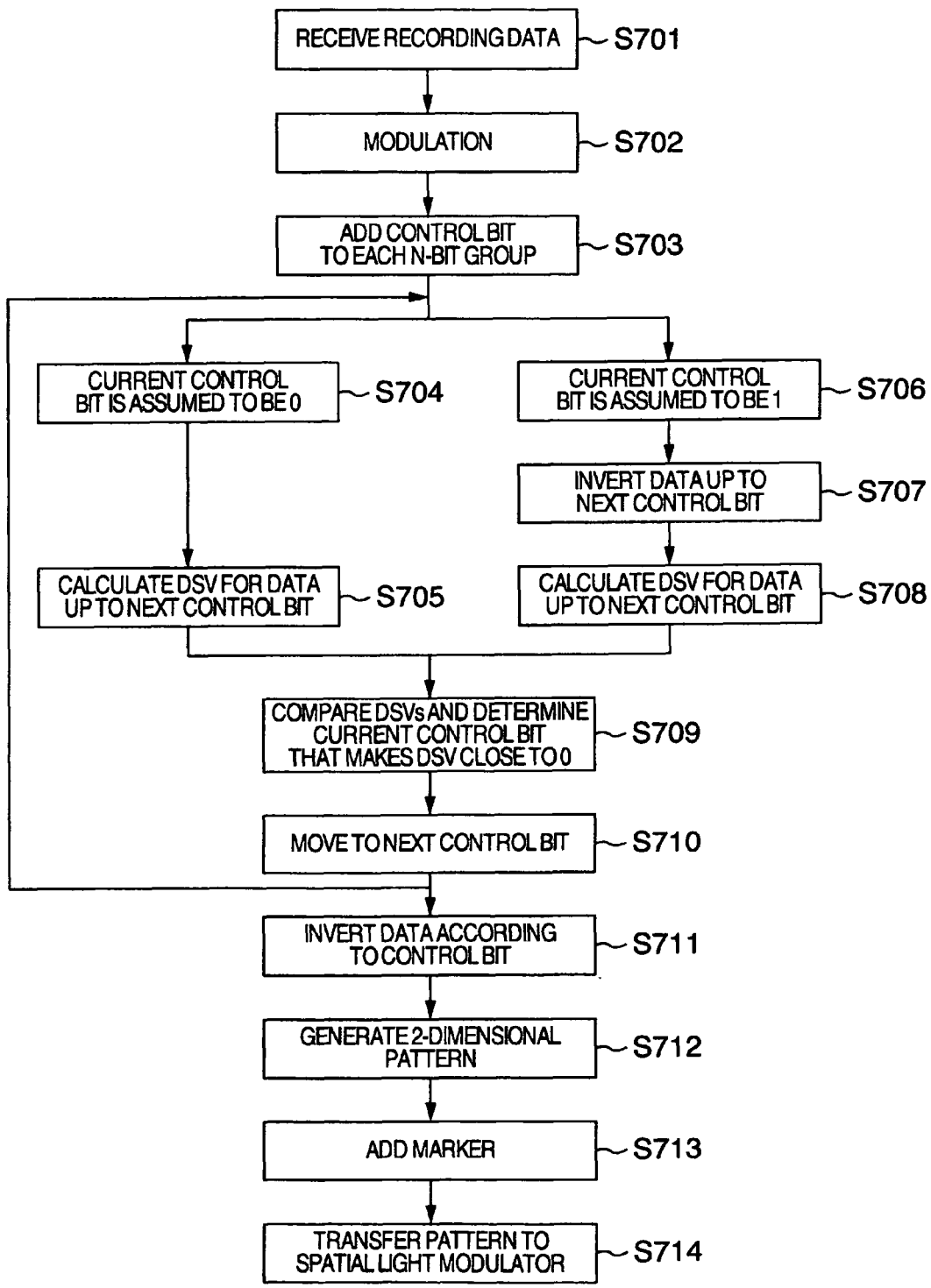
FIG. 7 is a flow chart showing an example of detailed operation flow performed by the optical information recording/reproducing apparatus during data recording.
Figure 8:
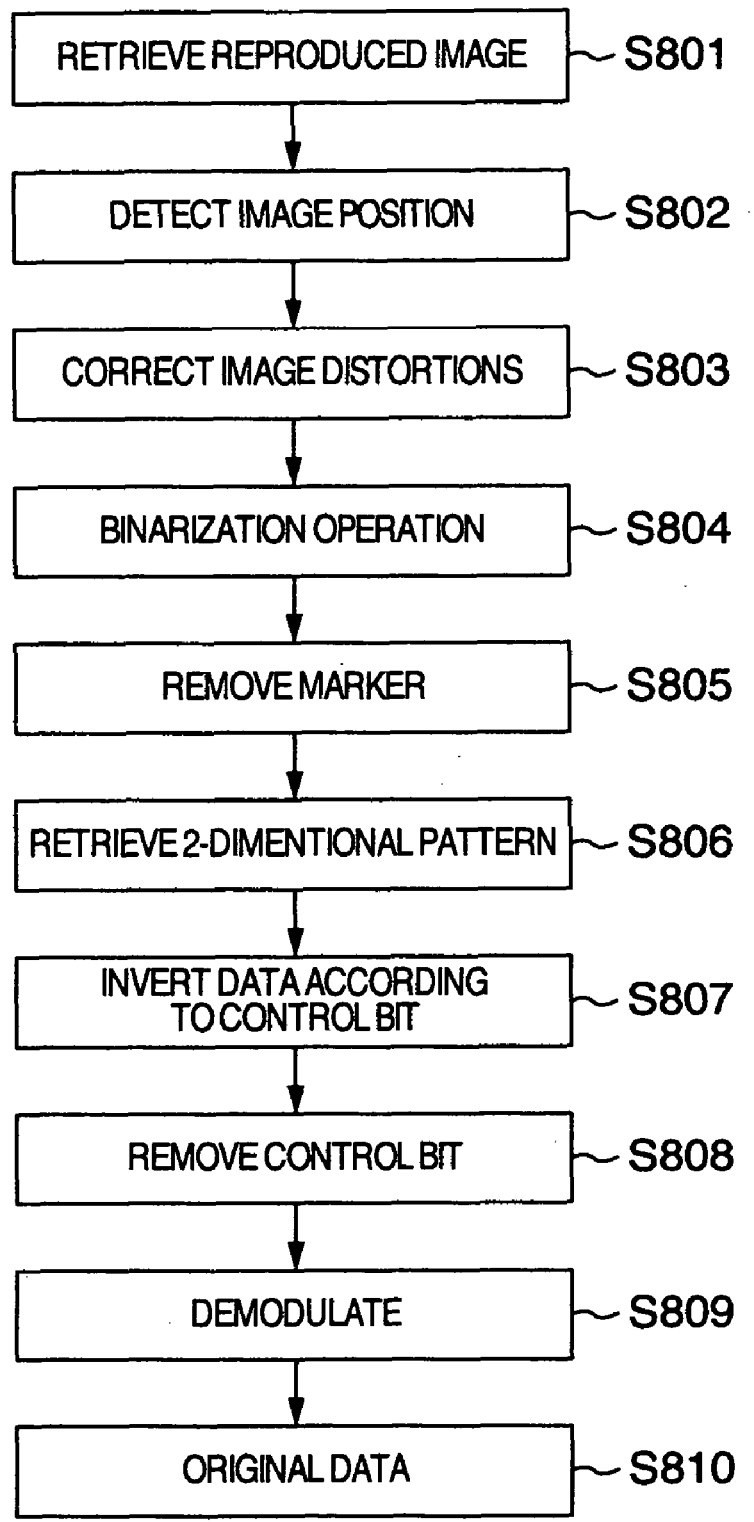
FIG. 8 is a flow chart showing an example of detailed operation flow performed by the optical information recording/reproducing apparatus during data reproduction.

The second embodiment differs from embodiment 1 in the 2-mensional data generation method of S306 and the data reproducing method of S317. FIG. 7 shows a detailed operation flow of S306 in FIG. 3B. FIG. 8 shows a detailed operation flow of S317 in FIG. 3C. FIGS. 9A-9F show examples of processing.

First, a detailed operation during recording will be explained. When the signal generation circuit 86 receives one page of recording data (S701) (FIG. 9A), it modulates data strings by using a modulation table (S702). Next, the data is divided into units of N bits, to each of which a control bit is added (S703) (FIG. 9B). The control bit is one bit in this embodiment but may be multiple bits. First, assuming that a control bit at a certain position is "0" (S704), a DSV up to the next control bit is calculated (S705). It is desired that the DSV be a sum value not only for the data between the control bits but also for all data up to that control bit. Next, when the control bit is assumed to be "1" (S706), an inversion operation of inverting "0" to "1" and "1" to "0" is executed on data strings up to the next control bit (S707). The inverted data strings are used to calculate a DSV up to the next control bit (S708). This data inversion may be performed commonly for several bits by using a table. The DSVs calculated by S705 and S708 are compared to determine a control bit added to make the DSV close to 0 (S709). The operations from S704 to S709 are repeated (S710) to determine all the control bits added in S703. The data strings to which this control bit was added are subjected to the inversion operation for each unit according to the control bit to generate the data strings to be recorded (S711) (FIG. 9C).

Figure 9D:
Figure 9E:
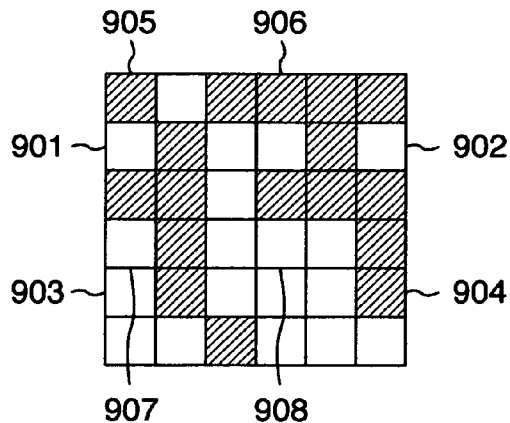
Figure 9F:
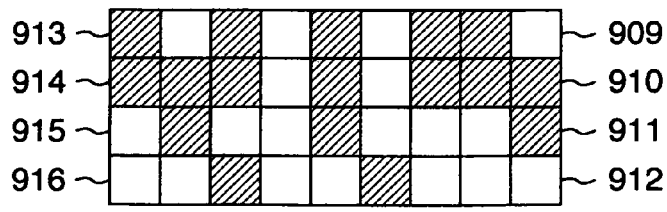

After this, 2-dimensional data is constructed as shown in FIG. 9D, with "0" taken as non-transmissive and "1" as transmissive (they may be opposite). For each unit to which a control bit is inserted, an area of n (vertical)×m (horizontal) pixels is set (901, 902, 903, 904) and bits are arranged there. This bit arrangement for each unit is repeated the same number of times as a page of data to create one page of 2-dimensional data (S712). In the example of FIG. 9E, the bit arrangement in the unit and the unit arrangement in the page are done by placing data beginning with the upper left and moving toward right and, when the right end is reached, moving one line down and then toward right. The data arrangement is not limited to this method. FIG. 9F shows an example configuration where n=1.

The 2-dimensional data constructed as described above is attached with a marker that works as a reference during reproduction (S713). The data marked in this way is transferred to the spatial light modulator 308 (S714).

Next, a detailed operation during reproduction will be explained. First, image data retrieved from the optical detector 318 is transferred to the signal processing circuit 85 (S801). The image position is detected with an image marker taken as a reference (S802). The image data undergoes a distortion correction, including image inclination, magnification and distortion (S803). The corrected image is then subjected to a binarization operation (S804) and removed of markers (S805) to obtain 2-dimensional data (S806). Although the binarization generally employs a method of comparing adjoining bits, other methods may be employed. By reversing the recording procedure, the 2-dimensional data is rearranged into 1-dimensional data, which is then inverted for each unit (S807). The inverted data is removed of the added control bits (S808) and demodulated into the original data strings by using the modulation table used for recording, thus reproducing the original data (8509) (S810).

With the above operation, 2-dimensional data can be created whose ratios of transmissive and non-transmissive bits are always even in the entire page data although they may differ among different units. This in turn allows the data to be recorded with the transmissivity kept constant among pages. During recording, a signal beam modulated by the spatial light modulator 308 is focused on the recording medium by the object lens 325, so a Fourier-transformed image is recorded. This means that if the transmissivity of created 2-dimensional data differs among different units, the recording medium is not affected.

Unlike embodiment 1, this embodiment does not perform such operations as NRZI modulation and thus can record data at high speed. It is noted, however, that since the data inversion depends on the control bits, the reading of the control bits becomes important as shown in FIG. 9E (905, 906, 907, 908). It is therefore effective to represent the control bit with multiple bits, as described above, add error correction codes or placing data at a central area of the page where reading errors are not likely to occur.

Embodiment 3

This embodiment differs from embodiment 1 in the control bit determination rule in S410. In embodiment 1, the DSVs calculated from S406 to S409 are compared and the control bit added in S403 is determined so as to make the DSV close to 0 (S410). In this embodiment, the control bit is determined so as to make the DSV close to a preset target value (S1010).

Figure 10:
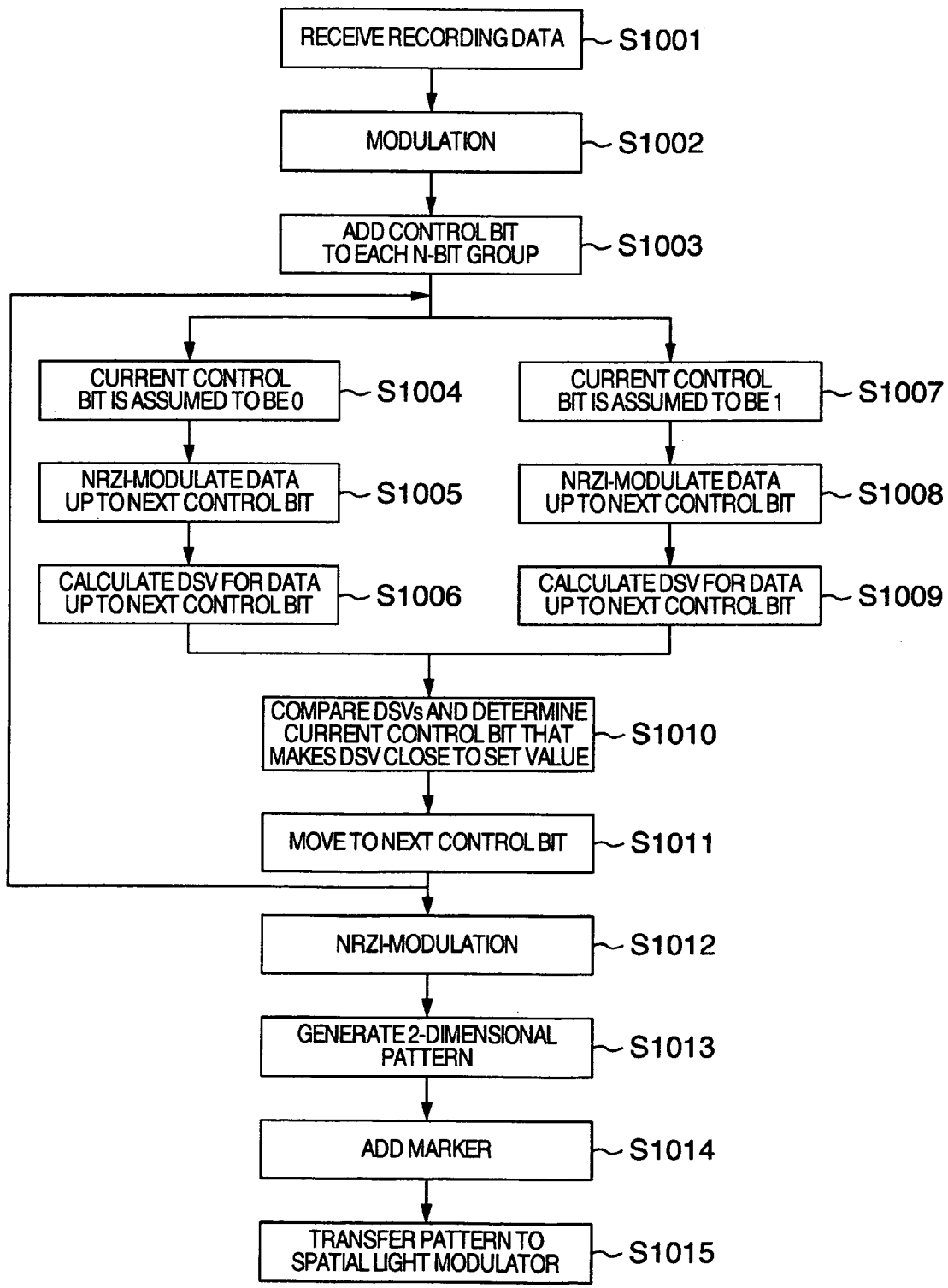
FIG. 10 is a flow chart showing an example of detailed operation flow performed by the optical information recording/reproducing apparatus during data recording.

Further, to make it easy to shift the DSV in a certain direction, it is useful to modulate the data in advance so as to make the ratios of "0" and "1" of the NRZI-modulated data uneven. For example, in the modulation operation of S1002 in FIG. 10, the modulation is executed using a modulation table such as one shown in FIG. 11A. This operation is characterized in that the modulated data has "1" appear the even number of times, which, when the data is NRZI-modulated, makes the frequencies of appearance of "0" and "1" differ. Although the use of this table renders the ratio of "0" and "1" uneven, the method of modulation is not limited to this table and other methods may be used as long as they can change the ratio of "0" and "1". While this table performs a modulation from 2-bits to 3 bits, other bit numbers may be used.

The above method can similarly applied also to embodiment 2. It is noted, however, that since embodiment 2 does not perform the NRZI modulation, it is useful to make a greater number of "0s" (or "1s") appear in the data modulated by S1002. For example, in the modulation operation S1002 of FIG. 10, a modulation table, such as shown in FIG. 11B, is used. Although the use of this table can render the ratio of "0" and 1" uneven, the modulation method is not limited to this table and other methods may be used as long as they can change the ratio of "0" and "1". While this table performs a modulation from 2 bits to 3 bits, other bit numbers may be used.

With the above operation, 2-dimensional data can be created whose ratio of transmissive and non-transmissive bits are always even in the entire page data although they may differ among different units. This allows the data to be recorded so that the transmissivity is kept constant among different pages. During recording, a signal beam modulated by the spatial light modulator 308 is focused on the recording medium by the object lens 325, so a Fourier-transformed image is recorded. This means that if the transmissivity of created 2-dimensional data differs among different units, the recording medium is not easily affected.

Further, in embodiment 1 since the ratio of "0" and "1" are equal, the transmissivity in one page can be set only at 50% by the spatial light modulator 308. In contrast to embodiment 1, this embodiment is characterized by the ability to set an arbitrary transmissivity. For example, the transmissivity can be made small by first setting the DSV target value at a negative value to make the ratio or frequency of "0" high, determining the control bit and then creating the 2-dimensional data with "0" taken as non-transmissive bit. This suppresses the consumption of a dynamic range of the medium, the level of multiplexing can be raised. Further, depending on the content of data, the advantage of this embodiment can be realized by setting the ratio of "0" and "1" within a predetermined range (e.g., 45%-55%). This in turn reduces loads during recording. What is described here also applies to other embodiments.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical information recording apparatus to record information in a holographic memory, the optical information recording apparatus comprising:
   a laser light source generating a signal beam and a reference beam;
   a signal generation unit adding at least one control bit to an input data and generating a first 2-dimensional page data;
   a spatial light modulator adding the first 2-dimensional page data to the signal beam; and
   a control unit controlling the laser light source, the signal generation unit, and the spatial modulator so as to record the information by irradiating the signal beam that is added to the first 2-dimensional page data by the spatial light modulator and the reference beam in the holographic memory,
   wherein the signal generation unit adds the at least one control bit so as to keep a ratio of a number of pixels of a first brightness of the spatial light modulator to a number of pixels of a second brightness that is larger than the first brightness in the first 2-dimensional page data equal to a ratio of the number of pixels of the first brightness of the spatial light modulator to a number of pixels of the second brightness in a second 2-dimensional page data that is different from the first 2-dimensional page data, the first 2-dimensional data and the second 2-dimensional data being recorded in the holographic memory.

2. The optical information recording apparatus according to claim 1, wherein the signal generation unit determines the at least one control bit so that the number of pixels of the first brightness of the spatial light modulator is larger than the number of pixels of the second brightness in the first and the second 2-dimensional page data.

3. The optical information recording apparatus according to claim 1, further comprising an NRZI modulation means, wherein the signal generation unit determines the at least one control bit based on a ratio of a number of pixels of the first brightness of data that is generated by adding the at least one control bit to the input data and executing NRZI modulation to a number of pixels of the second brightness.

4. The optical information recording apparatus according to claim 1, wherein the signal generation unit determines the at least one control bit based on a ratio of a number of pixels of the first brightness of data that is generated by inverting the input data based on the at least one control bit to a number of pixels of the second brightness.

5. An optical information recording apparatus according to claim 1, further comprising an angle control unit controlling an incident angle of the reference beam to the optical information recording medium, and wherein the first 2-dimensional page data is a recorded 2-page data with a first incident angle of the reference beam and the second 2-dimensional page data is a recorded 2-page data with a second incident angle of the reference beam that is different from the first incident angle.

6. An optical information recording apparatus to record information in a holographic memory, the optical information recording apparatus comprising:
   a laser light source generating a signal beam and a reference beam;
   a signal generation unit adding at least one control bit to an input data and generating a first 2-dimensional page data;
   a spatial light modulator adding the first 2-dimensional page data to the signal beam; and
   a control unit controlling the laser light source, the signal generation unit, and the spatial modulator so as to record the information by irradiating the signal beam which is added to the first 2-dimensional page data by the spatial light modulator and the reference beam in the holographic memory, wherein the signal generation unit adds the at least one control bit so as to keep a ratio of a number of pixels of a first brightness of the spatial light modulator to a number of pixels of a second brightness that is larger than the first brightness in the first 2-dimensional page data equal to a ratio of the number of pixels of the first brightness of the spatial light modulator to a number of pixels of the second brightness in a second 2-dimensional page data that is different from the first 2-dimensional page data, the first 2-dimensional data and the second 2-dimensional data being recorded in the holographic memory, and wherein the signal generation unit adds the at least one control bit so that a number of pixels of the first brightness of the spatial light modulator is larger than a number of pixels of the second brightness that is larger than the first brightness in the first and second 2-dimensional page data.

7. The optical information recording apparatus according to claim 6, wherein the signal generation unit determines the at least one control bit so as to keep a ratio of a number of pixels of the first brightness to a number of pixels of the second brightness in the first 2-dimensional page data and a ratio of a number of pixels of the first brightness to a number of pixels of the second brightness in a second 2-dimensional page data which is different from the first 2-dimensional page data constant.

8. The optical information recording apparatus according to claim 6, wherein the signal generation unit determines the at least one control bit based on a ratio of a number of pixels of the first brightness of data that is generated by adding the at least one control bit and executing NRZI modulation to a number of pixels of the second brightness.

9. The optical information recording apparatus according to claim 6, wherein the signal generation unit determines the at least one control bit based on a ratio of a number of pixels of the first brightness of data that is generated by inverting data based on the at least one control bit, and a number of pixels of the second brightness.

10. An optical information recording method to record information in a holographic memory, the method comprising:

generating a signal beam and a reference beam;

adding at least one control bit to an input data and generating a first 2-dimensional page data by a signal generation unit;

adding the first 2-dimensional page data to the signal beam by a spatial light modulator; and irradiating the signal beam that is added to the first 2-dimensional page data by the spatial light modulator and the reference beam in the holographic memory for recording the information;

wherein the signal generation unit adds the at least one control bit so as to keep a ratio of a number of pixels of a first brightness of the spatial light modulator to a number of pixels of a second brightness that is larger than the first brightness in a first 2-dimensional page data equal to a ratio of a number of pixels of the first brightness of the spatial light modulator to a number of pixels of the second brightness in a second 2-dimensional page data that is different from the first 2-dimensional page data, the first 2-dimensional data and the second 2-dimensional data being recorded in the holographic memory.

11. An optical information recording method according to claim 10, wherein the signal generation unit determines the at least one control bit so that the number of pixels of the first brightness of the spatial light modulator is larger than the number of pixels of the second brightness in the first and the second 2-dimensional page data.

12. An optical information recording method according to claim 10, wherein the signal generation unit determines the at least one control bit based on a ratio of a number of pixels of the first brightness of data that is generated by adding the at least one control bit and executing NRZI modulation to a number of pixels of the second brightness.

13. An optical information recording method according to claim 10, wherein the signal generation unit determines the at least one control bit based on a ratio of a number of pixels of the first brightness of data that is generated by inverting data based on the at least one control bit to a number of pixels of the second brightness.

14. An optical information recording method according to claim 10, further comprising controlling an incident angle of the reference beam to the optical information recording medium, and wherein the first 2-dimensional page data is a recorded 2-page data with a first incident angle of the reference beam and the second 2-dimensional page data is a recorded 2-page data with a second incident angle of the reference beam that is different from the first incident angle.

15. An optical information recording method to record information in a holographic memory, the method comprising:

generating a signal beam and a reference beam;

adding at least one control bit to an input data and generating a first 2-dimensional page data by a signal generation unit;

adding the first 2-dimensional page data to the signal beam by a spatial light modulator; and irradiating the signal beam that is added to the first 2-dimensional page data by the spatial light modulator and the reference beam in the holographic memory for recording the 2-dimensional page data, wherein the signal generation unit adds the at least one control bit so as to keep a ratio of a number of pixels of a first brightness of the spatial light modulator to a number of pixels of a second brightness that is larger than the first brightness in the first 2-dimensional page data equal to a ratio of the number of pixels of the first brightness of the spatial light modulator to a number of pixels of the second brightness in a second 2-dimensional page data that is different from the first 2-dimensional page data, the first 2-dimensional data and the second 2-dimensional data being recorded in the holographic memory, and wherein the signal generation unit adds the at least one control bit so that a number of pixels of the first brightness of the spatial light modulator is larger than a number of pixels of the second brightness that is larger than the first brightness in the first and second 2-dimensional page data.

16. An optical information recording method according to claim 15, wherein the signal generation unit determines the at least one control bit so as to keep a ratio of a number of pixels of the first brightness to a number of pixels of the second brightness in the first 2-dimensional page data and a ratio of a number of pixels of the first brightness to a number of pixels of the second brightness in a second 2-dimensional page data that is different from the first 2-dimensional page data constant.

17. An optical information recording method according to claim 15, wherein the signal generation unit determines the at least one control bit based on a ratio of a number of pixels of the first brightness of data that is generated by adding the at least one control bit and executing NRZI modulation to a number of pixels of the second brightness.

18. An optical information recording method according to claim 15, wherein the signal generation unit determines the at least one control bit based on a ratio of a number of pixels of the first brightness of data that is generated by inverting data based on the at least one control bit to a number of pixels of the second brightness.

* * * * *